United States Patent
Han et al.

(10) Patent No.: US 12,438,153 B2
(45) Date of Patent: Oct. 7, 2025

(54) LITHIUM SECONDARY BATTERY

(71) Applicant: LG Energy Solution, Ltd., Seoul (KR)

(72) Inventors: Jun Hyeok Han, Daejeon (KR); Kyoung Ho Ahn, Daejeon (KR); Chul Haeng Lee, Daejeon (KR); Sol Ji Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 615 days.

(21) Appl. No.: 17/605,375

(22) PCT Filed: Jul. 21, 2020

(86) PCT No.: PCT/KR2020/009607
§ 371 (c)(1),
(2) Date: Oct. 21, 2021

(87) PCT Pub. No.: WO2021/015535
PCT Pub. Date: Jan. 28, 2021

(65) Prior Publication Data
US 2022/0209230 A1     Jun. 30, 2022

(30) Foreign Application Priority Data
Jul. 22, 2019   (KR) ........................ 10-2019-0088427

(51) Int. Cl.
| | |
|---|---|
| H01M 4/525 | (2010.01) |
| H01M 4/505 | (2010.01) |
| H01M 10/0525 | (2010.01) |
| H01M 10/0569 | (2010.01) |
| H01M 4/02 | (2006.01) |

(52) U.S. Cl.
CPC ........... *H01M 4/525* (2013.01); *H01M 4/505* (2013.01); *H01M 10/0525* (2013.01); *H01M 10/0569* (2013.01); *H01M 2004/027* (2013.01); *H01M 2004/028* (2013.01); *H01M 2300/0034* (2013.01)

(58) Field of Classification Search
None
See application file for complete search history.

(56) References Cited

U.S. PATENT DOCUMENTS

| | | | | |
|---|---|---|---|---|
| 6,855,458 B1 * | 2/2005 | Kim | ................. | H01M 10/0569 429/330 |
| 2008/0160419 A1 * | 7/2008 | Segawa | ............. | H01M 10/0569 429/333 |
| 2010/0233542 A1 | 9/2010 | Endo et al. | | |
| 2011/0037440 A1 | 2/2011 | Endo et al. | | |
| 2011/0045360 A1 | 2/2011 | Deguchi | | |
| 2011/0195317 A1 | 8/2011 | Koh et al. | | |
| 2012/0164542 A1 | 6/2012 | Iwaya | | |
| 2013/0252113 A1 | 9/2013 | Yu et al. | | |
| 2013/0266847 A1 | 10/2013 | Noguchi et al. | | |
| 2014/0059845 A1 | 3/2014 | Endo et al. | | |
| 2016/0043389 A1 | 2/2016 | Deguchi et al. | | |
| 2018/0251681 A1 * | 9/2018 | Zhang | ............... | H01M 10/0567 |
| 2019/0074538 A1 | 3/2019 | Lee et al. | | |
| 2019/0074546 A1 | 3/2019 | Kim et al. | | |
| 2019/0148773 A1 | 5/2019 | Kim et al. | | |
| 2020/0168955 A1 * | 5/2020 | Shimanuki | ........ | H01M 10/0525 |

FOREIGN PATENT DOCUMENTS

| | | | |
|---|---|---|---|
| CN | 101878556 | A | 11/2010 |
| CN | 102017247 | A | 4/2011 |
| CN | 102113160 | A | 6/2011 |
| CN | 103250295 | A | 8/2013 |
| CN | 103733415 | A | 4/2014 |
| CN | 104124470 | B | 5/2017 |
| CN | 109428110 | A | 3/2019 |
| CN | 109713367 | A | 5/2019 |
| EP | 0757399 | A1 * | 2/1997 ............ H01M 10/40 |
| JP | 2013137945 | A | 7/2013 |
| JP | 5506682 | B2 | 5/2014 |
| KR | 20130114194 | A | 10/2013 |
| KR | 20140071870 | A | 6/2014 |
| KR | 20140081663 | A | 7/2014 |
| KR | 101567039 | B1 | 11/2015 |
| KR | 101574958 | B1 | 12/2015 |
| KR | 20160011548 | A | 2/2016 |

(Continued)

OTHER PUBLICATIONS

Pei Shi, Shaohua Fang, Dong Luo, Li Yang, Shin-ichi Hirano. A Safe Electrolyte Based on Propylene Carbonate and Non-Flammable Hydrofluoroether for High-Performance Lithium Ion Batteries, Journal of The Electrochemical Society, 164 (9) A1991-A1999 (2017). (Year: 2017).*

Yin Ding, Rui Wang, Lei Wang, Kailin Cheng, Zhikun Zhao, DaoBin Mu, Borong Wu. A short review on layered LiNi0.8Co0.1Mn0.1O2 positive electrode material for lithium-ion batteries, Energy Procedia 105 ( 2017 ) 2941-2952. (Year: 2017).*

David Yaohui Wang, Ang Xiao, Luke Wells, and J. R. Dahn. Effect of Mixtures of Lithium Hexafluorophosphate (LiPF6) and Lithium Bis(fluorosulfonyl)imide (LiFSI) as Salts in Li[Ni1/3Mn1/3Co1/3]O2/Graphite Pouch Cells, Journal of The Electrochemical Society, 162 (1) A169-A175. (Year: 2015).*

(Continued)

*Primary Examiner* — Carlos Barcena
(74) *Attorney, Agent, or Firm* — Lerner David LLP

(57) ABSTRACT

A lithium secondary battery is disclosed herein. In some embodiments, a lithium secondary battery includes a positive electrode including a lithium transition metal oxide represented by Formula 1, a negative electrode, a non-aqueous electrolyte solution containing a lithium salt, a first non-aqueous solvent, and a second non-aqueous solvent, and a separator, wherein the first non-aqueous solvent is a carbonate-based organic solvent, the second non-aqueous solvent is a fluorine-based organic solvent, and a volume ratio of the first non-aqueous solvent to the second non-aqueous solvent is in a range of 5:5 to 9:1.

8 Claims, No Drawings

(56) References Cited

FOREIGN PATENT DOCUMENTS

| | | |
|---|---|---|
| KR | 101702406 B1 | 2/2017 |
| KR | 20170034313 A | 3/2017 |
| KR | 20180013103 A | 2/2018 |
| KR | 20180086140 A | 7/2018 |
| KR | 20180087162 A | 8/2018 |
| KR | 20190026429 A | 3/2019 |
| WO | 2010013739 A1 | 2/2010 |
| WO | 2014147983 A1 | 9/2014 |
| WO | 2019107855 A1 | 6/2019 |

OTHER PUBLICATIONS

International Search Report for Application No. PCT/KR2020/009607 mailed Nov. 5, 2020, pp. 1-3.
Extended European Search Report for Application No. 20843247.6 dated May 2, 2022. 9 pgs.

\* cited by examiner

LITHIUM SECONDARY BATTERY

CROSS-REFERENCE TO RELATED APPLICATIONS

This application is a national phase entry under 35 U.S.C. § 371 of International Application No. PCT/KR2020/009607, filed on Jul. 21, 2020, which claims priority from Korean Patent Application No. 10-2019-0088427, filed on Jul. 22, 2019, the disclosure of which is incorporated by reference herein.

TECHNICAL FIELD

The present invention relates to a lithium secondary battery having improved cycle characteristics and capacity characteristics.

BACKGROUND ART

Development of secondary batteries, which may efficiently store and utilize electrical energy, has emerged importantly as personal IT devices and computer networks are developed with the development of information society and the accompanying dependency of society as a whole on the electrical energy is increased.

Particularly, since a lithium ion secondary battery has the theoretically highest energy density and may be miniaturized to be applicable to a personal IT device, research to apply the lithium ion secondary battery to various devices, such as an electric vehicle and a power storage device, is actively being conducted.

The lithium ion secondary battery is composed of a negative electrode including a negative electrode active material, a positive electrode including a positive electrode active material, an electrolyte solution including a lithium salt-containing non-aqueous organic solvent, and a separator.

Recently, in order to prepare a high-capacity battery, a positive electrode active material, such as a lithium transition metal oxide such as lithium cobalt oxide ($LiCoO_2$), a lithium iron phosphate compound ($LiFePO_4$), or lithium nickel oxide ($LiNiO_2$) in which a portion of nickel (Ni) is substituted with cobalt (Co) or manganese (Mn)/aluminum (Al), has been proposed, but there is a limitation in that it is difficult to secure sufficient capacity characteristics with such positive electrode active materials.

In order to improve this limitation, research has been conducted to prepare a high-Ni-based transition metal oxide in which a nickel content in a total transition metal content is greater than 60%.

However, dissolution of transition metal due to a side reaction between the positive electrode active material and the electrolyte solution occurs while structural stability and chemical stability of the positive electrode active material are reduced as the nickel (Ni) content in the positive electrode active material is increased. This phenomenon may be further intensified locally due to potential imbalance in the electrode when electrolyte solution wetting of the electrode is insufficient.

PRIOR ART DOCUMENT

Korean Patent Application Laid-open Publication No. 2014-0071870
Korean Patent Application Laid-open Publication No. 2016-0011548

DISCLOSURE OF THE INVENTION

Technical Problem

An aspect of the present invention provides a lithium secondary battery having improved room-temperature cycle characteristics and capacity characteristics by including both a non-aqueous electrolyte solution, in which viscosity is improved by including a first organic solvent and a second fluorine-based organic solvent in a specific ratio as a non-aqueous organic solvent, and a positive electrode including a high-nickel (Ni)-based transition metal oxide.

Technical Solution

According to an aspect of the present invention, there is provided a lithium secondary battery including:
a positive electrode including a lithium transition metal oxide represented by the following Formula 1,
a negative electrode,
a separator disposed between the positive electrode and the negative electrode, and
a non-aqueous electrolyte solution containing a lithium salt, a first non-aqueous solvent, and a second non-aqueous solvent,
wherein the first non-aqueous solvent is a carbonate-based organic solvent,
the second non-aqueous solvent is a fluorine-based organic solvent, and
a volume ratio of the first non-aqueous solvent to the second non-aqueous solvent is in a range of 5:5 to 9:1.

$$Li(Ni_aCo_bMn_c)O_2 \quad \text{[Formula 1]}$$

In Formula 1,
$0.6 \leq a \leq 0.9$, $0.05 \leq b < 0.3$, $0.05 \leq c < 0.3$, and $a+b+c=1$.

The lithium transition metal oxide represented by Formula 1 may be $Li(Ni_{0.6}Mn_{0.2}Co_{0.2})O_2$, $Li(Ni_{0.7}Mn_{0.15}Co_{0.15})O_2$, or $Li(Ni_{0.8}Mn_{0.1}Co_{0.1})O_2$, and may specifically be $Li(Ni_{0.7}Mn_{0.15}Co_{0.15})O_2$ or $Li(Ni_{0.8}Mn_{0.1}Co_{0.1})O_2$.

Also, the lithium salt may include at least one selected from the group consisting of $LiBF_4$, $LiPF_6$, $LiCH_3CO_2$, $LiCF_3CO_2$, $LiCH_3SO_3$, LiFSI (lithium bis(fluorosulfonyl)imide, $LiN(SO_2F)_2$), LiTFSI (lithium bis(trifluoromethanesulfonyl)imide, $LiN(SO_2CF_3)_2$), and LiBETI (lithium bis(perfluoroethanesulfonyl)imide, $LiN(SO_2C_2F_5)_2$), and may specifically include at least one selected from the group consisting of LiFSI, LiTFSI, and LiBETI.

The volume ratio of the first non-aqueous solvent to the second non-aqueous solvent may be in a range of 5:5 to 8:2, for example, 5:5 to 7:3.

Furthermore, the fluorine-based organic solvent may be a fluorine-containing aromatic organic solvent or a fluorine-containing ether organic solvent represented by the following Formula 2.

$$[R_1\text{—}O\text{—}R_2]_n \quad \text{[Formula 2]}$$

In Formula 2,
$R_1$ and $R_2$ are each independently an alkyl group having 1 to 10 carbon atoms, wherein at least one of $R_1$ or $R_2$ is substituted with at least one fluorine, and n is an integer of 1 to 10.

Specifically, the fluorine-containing aromatic organic solvent may include at least one selected from the group consisting of monofluorobenzene, 1,2-difluorobenzene, 1,2,3-trifluorobenzene, 1,2,3,4-tetrafluorobenzene, pentafluorobenzene, and hexafluorobenzene, and may more specifically include at least one selected from the group consisting of monofluorobenzene and 1,2-difluorobenzene.

Also, the fluorine-containing ether organic solvent may be 1,1,2,2-tetrafluoroethyl 2,2,3,3-tetrafluoropropyl ether or 1,1,2,2-tetrafluoroethyl 2,2,2-trifluoroethyl ether.

Advantageous Effects

According to the present invention, since electrolyte solution wetting of an electrode is improved by including both a non-aqueous electrolyte solution, in which viscosity is improved by including a fluorine-based organic solvent with low solubility of lithium, and a positive electrode including a high-nickel-based transition metal oxide, a lithium secondary battery having improved room-temperature cycle characteristics and capacity characteristics may be prepared.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Specifically, in an embodiment of the present invention, there is provided a lithium secondary battery including:
a positive electrode including a lithium transition metal oxide represented by the following Formula 1,
a negative electrode,
a separator disposed between the positive electrode and the negative electrode, and
a non-aqueous electrolyte solution containing a lithium salt, a first non-aqueous solvent, and a second non-aqueous solvent,
wherein the first non-aqueous solvent is a carbonate-based organic solvent,
the second non-aqueous solvent is a fluorine-based organic solvent, and
the first non-aqueous solvent and the second non-aqueous solvent are included in a volume ratio of 5:5 to 9:1.

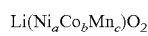  [Formula 1]

In Formula 1,
0.6≤a≤0.9, 0.05≤b<0.3, 0.05≤c<0.3, and a+b+c=1.

Positive Electrode

First, a positive electrode according to the present invention will be described.

The positive electrode included in the lithium secondary battery of the present invention may be represented by Formula 1.

The lithium transition metal oxide represented by Formula 1 has a nickel content of 0.60 or more, wherein, since it has high capacity per weight, it is advantageous in that it may prepare a secondary battery with high energy density.

The lithium transition metal oxide represented by Formula 1 may be $Li(Ni_{0.6}Mn_{0.2}Co_{0.2})O_2$, $Li(Ni_{0.7}Mn_{0.15}Co_{0.15})O_2$, or $Li(Ni_{0.8}Mn_{0.1}Co_{0.1})O_2$, and may specifically be $Li(Ni_{0.7}Mn_{0.15}Co_{0.15})O_2$ or $Li(Ni_{0.8}Mn_{0.1}Co_{0.1})O_2$ having a higher nickel (Ni) content.

With respect to a high-capacity transition metal oxide with a high nickel content, such as the lithium transition metal oxide represented by Formula 1, its structure collapses while a cation mixing phenomenon of $Li^{+1}$ ions and $Ni^{+2}$ ions in a layered structure of a positive electrode active material occurs during a charge and discharge process, and, as a result, a transition metal dissolution phenomenon occurs during a side reaction between the positive electrode active material and an electrolyte solution. This phenomenon may be further intensified locally due to a potential imbalance in the electrode when electrolyte solution wetting of the electrode is insufficient in a cell, that is, when there is a non-wetted region in the positive electrode.

Thus, in the present invention, since the electrolyte solution wetting of the electrode is improved by including a non-aqueous solution with reduced viscosity together as described later, the non-wetted region in the positive electrode may be minimized to prevent the above-described problem from being intensified.

The positive electrode of the present invention may be prepared by a conventional method and used.

That is, the positive electrode includes a positive electrode collector and a positive electrode material mixture layer formed on the positive electrode collector, and, in this case, the positive electrode material mixture layer may be prepared by coating the positive electrode collector with a positive electrode slurry including a positive electrode active material as well as optionally a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material may include a high-Ni-based lithium transition metal oxide having a nickel content greater than 60% like the lithium transition metal oxide represented by Formula 1.

The positive electrode active material may further include a metal oxide capable of reversibly intercalating and deintercalating lithium in addition to the high-Ni-based lithium transition metal oxide represented by Formula 1.

As a representative example, the metal oxide may further include at least one selected from lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2), etc.), lithium-nickel-cobalt-based oxide (e.g., $LiNi_{1-Y1}Co_{Y1}O_2$ (where 0<Y1<1), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1)).

The positive electrode active material may be included in an amount of 80 wt % to 99 wt %, for example, 93 wt % to 98 wt %, based on a total weight of solid content in the positive electrode slurry. In this case, if the amount of the positive electrode active material is 80 wt % or less, energy density may be decreased to reduce capacity.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be a fluororesin-based binder including polyvinylidene fluoride (PVDF) or polytetrafluoroethylene (PTFE); a rubber-based binder including a styrene butadiene rubber (SBR), an acrylonitrile-butadiene rubber, and a styrene-isoprene rubber; a cellulose-based binder including carboxymethyl cellulose (CMC), starch, hydroxypropyl cellulose, and regenerated cellulose; a poly alcohol-based binder including polyvinyl alcohol; a polyolefin-based binder including polyethylene and polypropylene; a polyimide-based binder; a polyester-based binder; and a silane-based binder.

Any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode slurry.

The solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of the solid content in the positive electrode slurry including the positive electrode active material as well as optionally the binder and the conductive agent is in a range of 10 wt % to 70 wt %, for example, 20 wt % to 60 wt %.

Negative Electrode

Also, the lithium secondary battery of the present invention may include a negative electrode prepared by a conventional method.

The negative electrode includes a negative electrode collector and a negative electrode material mixture layer formed on the negative electrode collector, and, in this case, the negative electrode material mixture layer may be prepared by coating the negative electrode collector with a negative electrode slurry including a negative electrode active material as well as optionally a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_{z3}$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be a fluororesin-based binder including polyvinylidene fluoride (PVDF) or polytetrafluoroethylene (PTFE); a rubber-based binder including a styrene butadiene rubber (SBR), an acrylonitrile-butadiene rubber, and a styrene-isoprene rubber; a cellulose-based binder including carboxymethyl cellulose (CMC), starch, hydroxypropyl cellulose, and regenerated cellulose; a poly alcohol-based binder including polyvinyl alcohol; a polyolefin-based binder including polyethylene and polypropylene; a polyimide-based binder; a polyester-based binder; and a silane-based binder.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the negative electrode slurry including the negative electrode active material as well as optionally the binder and the conductive agent is in a range of 50 wt % to 75 wt %, for example, 50 wt % to 65 wt %.

Non-Aqueous Electrolyte Solution

The lithium secondary battery of the present invention may include a non-aqueous electrolyte solution containing a lithium salt, a first non-aqueous solvent, and a second non-aqueous solvent.

(1) Lithium Salt

Any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $ClO_4^-$, $BF_4^-$, $B_{10}Cl_{10}^-$, $PF_6^-$, $CF_3SO_3^-$, $CH_3CO_2^-$, $CF_3CO_2^-$, $AsF_6^-$, $SbF_6^-$, $AlCl_4^-$, $AlO_4^-$, $CH_3SO_3^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $C_4F_9SO_3^-$, $CF_3CF_2SO_3^-$, $(FSO_2)_2N^-$, $(CF_3SO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $SCN^-$, and $(CF_3CF_2SO_2)_2N^-$ as an anion.

Specifically, the lithium salt may include a single material selected from the group consisting of $LiBF_4$, $LiPF_6$, $LiCH_3CO_2$, $LiCF_3CO_2$, $LiCH_3SO_3$, LiFSI (lithium bis(fluorosulfonyl) imide, $LiN(SO_2F)_2$), LiTFSI (lithium bis(trifluoromethanesulfonyl)imide, $LiN(SO_2CF_3)_2$), and LiBETI (lithium bis(perfluoroethanesulfonyl)imide, $LiN(SO_2C_2F_5)_2$), or a mixture of two or more thereof.

$LiPF_6$, among the lithium salts, is generally used in the preparation of most non-aqueous electrolyte solutions, but, since it generates a large amount of HF gas and a chemical side reaction with lithium is relatively large, it has a disadvantage of degrading discharge output characteristics by forming a resistance layer on a surface of the lithium. In contrast, with respect to LiFSI, LiTFSI, and LiBETI, particularly, LiFSI, viscosity is lower than that of $LiPF_6$ and high ionic conductivity may be secured. Thus, when the LiFSI is included, since viscosity of the non-aqueous electrolyte solution may be relatively reduced and an additional decomposition reaction may be suppressed by forming a protective layer on the surface of the lithium, the discharge output characteristics may be further improved.

Therefore, the non-aqueous electrolyte solution of the present invention may include at least one lithium salt selected from the group consisting of LiFSI, LiTFSI, and LiBETI.

A concentration of the lithium salt may be appropriately changed in a normally usable range, but the lithium salt may be included in a concentration of 0.8 M to 3.0 M, particularly 1.0 M to 3.0 M, and more particularly 1.5 M to 2.8 M in the electrolyte solution to obtain an optimum effect of forming a film for preventing corrosion of a surface of the electrode.

If the concentration of the lithium salt is less than 0.8 M, effects of improving low-temperature capacity of the lithium secondary battery and improving cycle characteristics during high-temperature storage are insignificant, and, if the concentration of the lithium salt is greater than 3.0 M, the electrolyte solution wetting may be reduced due to an increase in the viscosity of the non-aqueous electrolyte solution.

(2) First Non-Aqueous Solvent

The first non-aqueous solvent may include a carbonate-based organic solvent.

The carbonate-based organic solvent may include at least one of a cyclic carbonate-based organic solvent and a linear carbonate-based organic solvent so as to exhibit desired characteristics with an additive while minimizing decomposition due to an oxidation reaction during charge and discharge of the secondary battery.

The cyclic carbonate-based organic solvent is known as a solvent which well dissociates the lithium salt in the electrolyte due to high permittivity as a highly viscous organic solvent. Typical examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), and, among them, the cyclic carbonate-based organic solvent may include ethylene carbonate which may maintain passivation ability of a stable solid electrolyte interphase (SEI).

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethylmethyl carbonate (EMC), methylpropyl carbonate, and ethylpropyl carbonate, and, among them, the linear carbonate-based organic solvent may include dimethyl carbonate (DMC) having low viscosity characteristics while having a small molecular size.

As the first non-aqueous solvent, the linear carbonate-based organic solvent having low viscosity and low permittivity is used alone or the cyclic carbonate-based organic solvent and the linear carbonate-based organic solvent may be mixed and used. If, in a case in which the cyclic carbonate-based organic solvent and the linear carbonate-based organic solvent are mixed and used, the non-aqueous electrolyte solution of the present invention may use the linear carbonate-based organic solvent having low viscosity and low permittivity in a volume ratio of 5 or more so as to minimize the increase in the viscosity. Specifically, the cyclic carbonate-based organic solvent and the linear carbonate-based organic solvent may be used in a volume ratio of about 0.3:9.7 to about 3:7, for example, 0.5:9.5 to 1:9.

(3) Second Non-Aqueous Solvent

Also, the non-aqueous electrolyte solution of the present invention may include a fluorine-based organic solvent as the second non-aqueous solvent.

The fluorine-based organic solvent may be a fluorine-containing aromatic organic solvent or a fluorine-containing ether organic solvent represented by the following Formula 2.

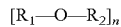   [Formula 2]

In Formula 2, $R_1$ and $R_2$ are each independently an alkyl group having 1 to 10 carbon atoms, wherein at least one of $R_1$ or $R_2$ is substituted with at least one fluorine, and n is an integer of 1 to 10.

Specifically, the fluorine-containing aromatic organic solvent may include at least one selected from the group consisting of monofluorobenzene, 1,2-difluorobenzene, 1,2,3-trifluorobenzene, 1,2,3,4-tetrafluorobenzene, pentafluorobenzene, and hexafluorobenzene, and may more specifically include at least one selected from the group consisting of monofluorobenzene and 1,2-difluorobenzene, which have lower viscosity, in order to minimize the increase in the viscosity of the electrolyte solution.

Also, the fluorine-containing ether organic solvent represented by Formula 2 is a linear ether organic solvent substituted with a plurality of fluorine, wherein it has low viscosity and low salt solubility, and, in this case, it is known that the longer the length of a chain is, the higher the viscosity is and the lower the salt solubility is.

Thus, in Formula 2, $R_1$ is an alkyl group having 2 to 8 carbon atoms which is substituted with at least one fluorine, $R_2$ is an alkyl group having 1 to 7 carbon atoms which is substituted with at least one fluorine, and n may be an integer of 1 to 5.

Specifically, in order to minimize the increase in the viscosity of the electrolyte solution, in Formula 2, $R_1$ is an alkyl group having 2 to 6 carbon atoms which is substituted with at least one fluorine, $R_2$ is an alkyl group having 1 to 5 carbon atoms which is substituted with at least one fluorine, and n may be an integer of 1 to 5.

More specifically, the fluorine-containing ether organic solvent may be 1,1,2,2-tetrafluoroethyl 2,2,3,3-tetrafluoropropyl ether represented by the following Formula 2-1 or 1,1,2,2-tetrafluoroethyl 2,2,2-trifluoroethyl ether represented by the following Formula 2-2.

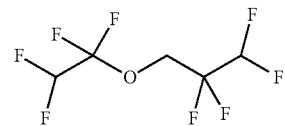   [Formula 2-1]

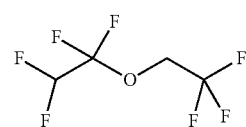   [Formula 2-2]

Currently, most secondary batteries use a non-fluorine-based carbonate organic solvent, particularly, a high-viscosity cyclic carbonate-based organic solvent as a main solvent of a non-aqueous electrolyte solution, wherein these solvents may deform a structure of the battery to degrade stability, for example, cell swelling occurs because gas is generated due to oxidation of the electrolyte solution when these solvents are generally stored for a long period of time at high temperature. Furthermore, since a reaction heat generated by a side reaction between an electrode and the non-fluorine-based carbonate solvent increases internal temperature of the battery and, when the temperature reaches a temperature above an ignition point, the high-viscosity cyclic carbonate-based organic solvent is combined with surrounding oxygen to lead to a thermal-runaway phenomenon, the secondary battery may ignite and explode.

Thus, the non-aqueous electrolyte solution of the present invention is characterized in that it includes a fluorine-based organic solvent with excellent electrochemical stability as well as the non-fluorine-based carbonate organic solvent as a main solvent. That is, since the fluorine-based organic solvent has high oxidation stability at room temperature and high temperature, has low viscosity, and forms a LiF-containing layer which is stable even at a high voltage, a side reaction between the non-aqueous electrolyte solution and the electrode, particularly, the positive electrode may be prevented during operation (charge and discharge) at a high voltage or during high-temperature storage.

Also, in the present invention, in order to suppress the increase in the viscosity of the electrolyte solution, the carbonate-based organic solvent, as the first non-aqueous solvent, and the fluorine-based organic solvent, as the second non-aqueous solvent, may be used by being mixed in a volume ratio of 5:5 to 9:1, particularly 5:5 to 8:2, and more particularly 5:5 to 7:3.

If the volume ratio of the first non-aqueous solvent is less than 5, an amount of the carbonate-based solvent participating in salt dissociation may be reduced to reduce ionic conductivity. Also, if the volume ratio of the carbonate-based organic solvent is greater than 9, that is, the volume ratio of the fluorine-based organic solvent is less than 1, the viscosity of the electrolyte solution is increased, and, accordingly, an effect of $Li^+$ ion diffusion may be reduced.

That is, since the non-aqueous electrolyte solution, in which the first non-aqueous solvent and the second non-aqueous solvent are mixed in the above-described ratio, is provided in the present invention, wetting of the electrolyte solution may be improved by securing a similar level of ionic conductivity in comparison to an electrolyte solution only composed of a conventional carbonate-based organic solvent and simultaneously reducing the viscosity of the electrolyte solution. That is, the viscosity of the non-aqueous electrolyte solution is reduced while maintaining a dissociation structure between the carbonate-based organic solvent and the lithium salt, and based on this, a degree of dissociation of the lithium salt may be increased to increase the effect of Li$^+$ ion diffusion.

(4) Third Non-Aqueous Solvent

The non-aqueous electrolyte solution for a lithium secondary battery of the present invention may further include at least one organic solvent selected from a linear ester-based organic solvent, a cyclic ester-based organic solvent, an ether-based organic solvent, or an amide-based organic solvent, as a third non-aqueous solvent, if necessary.

In this case, the first non-aqueous solvent and the third non-aqueous solvent may be included in a volume ratio of 1:0.1 to 1:0.5 in order to improve battery capacity.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate, but the present invention is not limited thereto.

Specific examples of the cyclic ester-based organic solvent may be any one selected from the group consisting of γ-butyrolactone, γ-valerolactone, γ-caprolactone, ε-valerolactone, and σ-caprolactone or a mixture of two or more thereof, but the present invention is not limited thereto.

Also, as the ether-based organic solvent, any one selected from the group consisting of dimethyl ether, diethyl ether, dipropyl ether, methylethyl ether, methylpropyl ether, and ethylpropyl ether or a mixture of two or more thereof may be used, but the present invention is not limited thereto.

(5) Additional Additives

In order to prevent the non-aqueous electrolyte solution from being decomposed to cause collapse of the electrode in a high-voltage environment, or further improve low-temperature high-rate discharge characteristics, high-temperature stability, overcharge protection, and a battery swelling suppression effect at high temperatures, the non-aqueous electrolyte solution included in the lithium secondary battery of the present invention may further include additional additives in the non-aqueous electrolyte solution, if necessary.

Typical examples of the additional additive may be at least one additional additive selected from the group consisting of a cyclic carbonate-based compound, a halogen-substituted carbonate-based compound, a sultone-based compound, a sulfate-based compound, a phosphate-based compound, a borate-based compound, a nitrile-based compound, an amine-based compound, a silane-based compound, and a lithium salt-based compound.

The cyclic carbonate-based compound may include vinylene carbonate (VC) or vinyl ethylene carbonate which may form a robust SEI by being electrochemically decomposed on surfaces of the positive electrode and the negative electrode.

The halogen-substituted carbonate-based compound may include fluoroethylene carbonate (FEC).

The sultone-based compound is a material capable of forming a stable SEI on the surface of the negative electrode by a reduction reaction, wherein the sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound is a material capable of forming a stable SEI, which does not crack even during high-temperature storage, by being electrically decomposed on the surface of the negative electrode, wherein the sulfate-based compound may include ethylene sulfate (Esa), trimethylene sulfate (TMS), or methyl trimethylene sulfate (MTMS).

The phosphate-based compound may include at least one compound selected from the group consisting of lithium difluorobis(oxalato)phosphate, lithium difluorophosphate, tris(trimethylsilyl) phosphate, tris(trimethylsilyl) phosphite, tris(2,2,2-trifluoroethyl)phosphate, and tris(trifluoroethyl) phosphite.

The borate-based compound may include tetraphenylborate, lithium oxalyldifluoroborate (LiODFB), or LiBOB (lithium bis(oxalato)borate (LiB($C_2O_4$)$_2$)).

The nitrile-based compound may include at least one compound selected from the group consisting of succinonitrile, adiponitrile, acetonitrile, propionitrile, butyronitrile, valeronitrile, caprylonitrile, heptanenitrile, cyclopentanecarbonitrile, cyclohexanecarbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The amine-based compound may include triethanolamine or ethylenediamine, and the silane-based compound may include tetravinylsilane.

The lithium salt-based compound is a compound different from the lithium salt included in the non-aqueous electrolyte solution, wherein the lithium salt-based compound may include at least one compound selected from the group consisting of LiPO$_2$F$_2$ and LiBF$_4$.

In a case in which, among these additional additives, vinylene carbonate, vinyl ethylene carbonate, fluoroethylene carbonate (FEC), or succinonitrile is included, a more robust SEI may be formed on the surface of the negative electrode during an initial activation process of the secondary battery.

The additional additives may be used as a mixture of two or more thereof, and may be included in an amount of 0.1 wt % to 50 wt %, particularly 0.1 wt % to 10 wt %, and preferably 0.05 wt % to 5 wt % based on a total weight of the non-aqueous electrolyte solution. If the mixed amount of the additional additives is less than 0.1 wt %, effects of improving low-temperature capacity, high-temperature storage characteristics, and high-temperature life characteristics of the battery are insignificant, and, if the mixed amount of the additional additives is greater than 50 wt %, there is a possibility that the side reaction in the electrolyte solution occurs excessively during charge and discharge of the battery. Particularly, since the additives for forming an SEI may not be sufficiently decomposed at high temperatures when excessive amounts of the additives for forming an SEI are added, the additives for forming an SEI may be present in the form of an unreacted material or precipitates in the electrolyte solution at room temperature. Accordingly, a side reaction may occur in which life or resistance characteristics of the secondary battery are degraded.

Separator

In the lithium secondary battery of the present invention, the separator blocks an internal short circuit by separating the negative electrode and the positive electrode and provides a movement path of lithium ions by being impregnated with the non-aqueous electrolyte solution, wherein any separator may be used without particular limitation as long as it is typically used as a separator in a lithium secondary battery, but, specifically, a separator having high moisture-retention ability for an electrolyte solution as well as low resistance to the transfer of lithium ions of the electrolyte solution may be used.

After mixing a polymer resin, a filler, and a solvent to prepare a separator composition, the separator composition is directly coated on the electrode and dried to form a separator film, or, after the separator composition is cast on a support and dried, the separator may be formed by laminating a separator film peeled from the support on the electrode.

Specifically, a typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or by laminating two or more layers thereof as the separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength.

The porous separator may generally have a pore diameter of 0.01 m to 50 m and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

Hereinafter, the present invention will be described in detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

After dimethyl carbonate (DMC) and monofluorobenzene (FB) were mixed in a volume ratio of 9:1, a non-aqueous electrolyte solution for a lithium secondary battery was prepared by dissolving LiFSI at a concentration of 2.4 M.

(Secondary Battery Preparation)

A positive electrode active material (Li(Ni$_{0.8}$Mn$_{0.1}$Co$_{0.1}$)O$_2$: NCM811), a conductive agent (carbon black), and a binder (polyvinylidene fluoride (PVDF)) were added to N-methyl-2-pyrrolidone (NMP) in a weight ratio of 90:5:5 to prepare a positive electrode active material slurry (solid content of 55 wt %). A 20 μm thick positive electrode collector (Al thin film) was coated with the positive electrode active material slurry, dried, and roll-pressed to prepare a positive electrode.

Subsequently, a negative electrode (Li/Cu) was prepared by bonding a 10 μm lithium metal to a 20 μm thick copper foil.

Then, after an electrode assembly was prepared by disposing a porous polyethylene film between the above-prepared positive electrode and negative electrode, the electrode assembly was put in a battery case, the above-prepared non-aqueous electrolyte solution was injected, and the battery case was sealed to prepare a lithium secondary battery (see Table 1 below).

Example 2

(Non-Aqueous Electrolyte Solution Preparation)

After dimethyl carbonate (DMC) and monofluorobenzene (FB) were mixed in a volume ratio of 8:2, a non-aqueous electrolyte solution for a lithium secondary battery was prepared by dissolving LiFSI at a concentration of 2.0 M.

(Secondary Battery Preparation)

A lithium secondary battery was prepared in the same manner as in Example 1 except that the above-prepared non-aqueous electrolyte solution, instead of the non-aqueous electrolyte solution prepared in Example 1, was used (see Table 1 below).

Example 3

(Non-Aqueous Electrolyte Solution Preparation)

After dimethyl carbonate (DMC) and monofluorobenzene (FB) were mixed in a volume ratio of 7:3, a non-aqueous electrolyte solution for a lithium secondary battery was prepared by dissolving LiFSI at a concentration of 1.5 M.

(Secondary Battery Preparation)

A lithium secondary battery was prepared in the same manner as in Example 1 except that the above-prepared non-aqueous electrolyte solution, instead of the non-aqueous electrolyte solution prepared in Example 1, was used (see Table 1 below).

Example 4

(Non-Aqueous Electrolyte Solution Preparation)

After dimethyl carbonate (DMC) and 1,1,2,2-tetrafluoroethyl 2,2,3,3-tetrafluoropropyl ether were mixed in a volume ratio of 9:1, a non-aqueous electrolyte solution for a lithium secondary battery was prepared by dissolving LiFSI at a concentration of 2.4 M.

(Secondary Battery Preparation)

A lithium secondary battery was prepared in the same manner as in Example 1 except that the above-prepared non-aqueous electrolyte solution, instead of the non-aqueous electrolyte solution prepared in Example 1, was used (see Table 1 below).

Example 5

(Non-Aqueous Electrolyte Solution Preparation)

After dimethyl carbonate (DMC) and 1,1,2,2-tetrafluoroethyl 2,2,3,3-tetrafluoropropyl ether were mixed in a volume ratio of 8:2, a non-aqueous electrolyte solution for a lithium secondary battery was prepared by dissolving LiFSI at a concentration of 2.0 M (see Table 1 below).

(Secondary Battery Preparation)

A lithium secondary battery was prepared in the same manner as in Example 1 except that the above-prepared non-aqueous electrolyte solution, instead of the non-aqueous electrolyte solution prepared in Example 1, was used.

Example 6

(Non-Aqueous Electrolyte Solution Preparation)

After dimethyl carbonate (DMC) and 1,1,2,2-tetrafluoroethyl 2,2,3,3-tetrafluoropropyl ether were mixed in a volume ratio of 7:3, a non-aqueous electrolyte solution for a lithium secondary battery was prepared by dissolving LiFSI at a concentration of 1.5 M (see Table 1 below).

(Secondary Battery Preparation)

A lithium secondary battery was prepared in the same manner as in Example 1 except that the above-prepared non-aqueous electrolyte solution, instead of the non-aqueous electrolyte solution prepared in Example 1, was used (see Table 1 below).

Example 7

(Non-Aqueous Electrolyte Solution Preparation)

After dimethyl carbonate (DMC) and 1,1,2,2-tetrafluoroethyl 2,2,2-trifluoroethyl ether were mixed in a volume ratio of 9:1, a non-aqueous electrolyte solution for a lithium secondary battery was prepared by dissolving LiFSI at a concentration of 2.4 M.

(Secondary Battery Preparation)

A lithium secondary battery was prepared in the same manner as in Example 1 except that the above-prepared non-aqueous electrolyte solution, instead of the non-aqueous electrolyte solution prepared in Example 1, was used (see Table 1 below).

Example 8

(Non-Aqueous Electrolyte Solution Preparation)

After dimethyl carbonate (DMC) and 1,1,2,2-tetrafluoroethyl 2,2,2-trifluoroethyl ether were mixed in a volume ratio of 8:2, a non-aqueous electrolyte solution for a lithium secondary battery was prepared by dissolving LiFSI at a concentration of 2.0 M.

(Secondary Battery Preparation)

A lithium secondary battery was prepared in the same manner as in Example 1 except that the above-prepared non-aqueous electrolyte solution, instead of the non-aqueous electrolyte solution prepared in Example 1, was used (see Table 1 below).

Example 9

(Non-Aqueous Electrolyte Solution Preparation)

After dimethyl carbonate (DMC) and 1,1,2,2-tetrafluoroethyl 2,2,2-trifluoroethyl ether were mixed in a volume ratio of 7:3, a non-aqueous electrolyte solution for a lithium secondary battery was prepared by dissolving LiFSI at a concentration of 1.5 M.

(Secondary Battery Preparation)

A lithium secondary battery was prepared in the same manner as in Example 1 except that the above-prepared non-aqueous electrolyte solution, instead of the non-aqueous electrolyte solution prepared in Example 1, was used (see Table 1 below).

Example 10

(Secondary Battery Preparation)

A positive electrode active material ($Li(Ni_{0.6}Mn_{0.2}Co_{0.2})O_2$: NCM622), a conductive agent (carbon black), and a binder (polyvinylidene fluoride (PVDF)) were added to N-methyl-2-pyrrolidone (NMP) in a weight ratio of 90:5:5 to prepare a positive electrode active material slurry (solid content of 55 wt %). A 20 µm thick positive electrode collector (Al thin film) was coated with the positive electrode active material slurry, dried, and roll-pressed to prepare a positive electrode.

Subsequently, a negative electrode (Li/Cu) was prepared by bonding a 10 µm lithium metal to a 20 µm thick copper foil.

Then, after an electrode assembly was prepared by disposing a porous polyethylene film between the above-prepared positive electrode and negative electrode, the electrode assembly was put in a battery case, the non-aqueous electrolyte solution prepared in Example 3 was injected, and the battery case was sealed to prepare a lithium secondary battery (see Table 1 below).

Example 11

(Secondary Battery Preparation)

A positive electrode active material ($Li(Ni_{0.6}Mn_{0.2}Co_{0.2})O_2$: NCM622), a conductive agent (carbon black), and a binder (polyvinylidene fluoride (PVDF)) were added to N-methyl-2-pyrrolidone (NMP) in a weight ratio of 90:5:5 to prepare a positive electrode active material slurry (solid content of 55 wt %). A 20 µm thick positive electrode collector (Al thin film) was coated with the positive electrode active material slurry, dried, and roll-pressed to prepare a positive electrode.

Subsequently, a negative electrode (Li/Cu) was prepared by bonding a 10 µm lithium metal to a 20 µm thick copper foil.

Then, after an electrode assembly was prepared by disposing a porous polyethylene film between the above-prepared positive electrode and negative electrode, the electrode assembly was put in a battery case, the non-aqueous electrolyte solution prepared in Example 6 was injected, and the battery case was sealed to prepare a lithium secondary battery (see Table 1 below).

Example 12

(Secondary Battery Preparation)

A positive electrode active material ($Li(Ni_{0.6}Mn_{0.2}Co_{0.2})O_2$: NCM622), a conductive agent (carbon black), and a binder (polyvinylidene fluoride (PVDF)) were added to N-methyl-2-pyrrolidone (NMP) in a weight ratio of 90:5:5 to prepare a positive electrode active material slurry (solid content of 55 wt %). A 20 µm thick positive electrode collector (Al thin film) was coated with the positive electrode active material slurry, dried, and roll-pressed to prepare a positive electrode.

Subsequently, a negative electrode (Li/Cu) was prepared by bonding a 10 µm lithium metal to a 20 µm thick copper foil.

Then, after an electrode assembly was prepared by disposing a porous polyethylene film between the above-prepared positive electrode and negative electrode, the electrode assembly was put in a battery case, the non-aqueous electrolyte solution prepared in Example 9 was injected, and the battery case was sealed to prepare a lithium secondary battery (see Table 1 below).

Example 13

A non-aqueous electrolyte solution and a lithium secondary battery were prepared in the same manner as in Example 1 except that $LiPF_6$, instead of LiFSI, was included as a lithium salt during the preparation of the non-aqueous electrolyte solution (see Table 1 below).

Example 14

A non-aqueous electrolyte solution and a lithium secondary battery were prepared in the same manner as in Example 2 except that $LiPF_6$, instead of LiFSI, was included as a lithium salt during the preparation of the non-aqueous electrolyte solution (see Table 1 below).

Example 15

A non-aqueous electrolyte solution and a lithium secondary battery were prepared in the same manner as in Example 3 except that LiPF$_6$, instead of LiFSI, was included as a lithium salt during the preparation of the non-aqueous electrolyte solution (see Table 1 below).

Example 16

A non-aqueous electrolyte solution and a lithium secondary battery were prepared in the same manner as in Example 1 except that 1.8 M LiPF$_6$, instead of 2.4 M LiFSI, was included as a lithium salt during the preparation of the non-aqueous electrolyte solution (see Table 1 below).

Example 17

A non-aqueous electrolyte solution and a lithium secondary battery were prepared in the same manner as in Example 2 except that 1.4 M LiPF$_6$, instead of 2.0 M LiFSI, was included as a lithium salt during the preparation of the non-aqueous electrolyte solution (see Table 1 below).

Example 18

A non-aqueous electrolyte solution and a lithium secondary battery were prepared in the same manner as in Example 3 except that 0.9 M LiPF$_6$, instead of 1.5 M LiFSI, was included as a lithium salt during the preparation of the non-aqueous electrolyte solution (see Table 1 below).

Comparative Example 1

(Non-Aqueous Electrolyte Solution Preparation)

A non-aqueous electrolyte solution for a lithium secondary battery was prepared by dissolving LiFSI in dimethyl carbonate (DMC) at a concentration of 2.8 M.

(Secondary Battery Preparation)

A lithium secondary battery was prepared in the same manner as in Example 1 except that the above-prepared non-aqueous electrolyte solution, instead of the non-aqueous electrolyte solution prepared in Example 1, was used (see Table 1 below).

Comparative Example 2

(Non-Aqueous Electrolyte Solution Preparation)

A non-aqueous electrolyte solution for a lithium secondary battery was prepared by dissolving LiFSI in dimethyl carbonate (DMC) at a concentration of 2.4 M.

(Secondary Battery Preparation)

A lithium secondary battery was prepared in the same manner as in Example 1 except that the above-prepared non-aqueous electrolyte solution, instead of the non-aqueous electrolyte solution prepared in Example 1, was used (see Table 1 below).

Comparative Example 3

(Secondary Battery Preparation)

A positive electrode active material (Li(Ni$_{0.6}$Mn$_{0.2}$Co$_{0.2}$)O$_2$: NCM622), a conductive agent (carbon black), and a binder (polyvinylidene fluoride (PVDF)) were added to N-methyl-2-pyrrolidone (NMP) in a weight ratio of 90:5:5 to prepare a positive electrode active material slurry (solid content of 55 wt %). A 20 µm thick positive electrode collector (Al thin film) was coated with the positive electrode active material slurry, dried, and roll-pressed to prepare a positive electrode.

Subsequently, a negative electrode (Li/Cu) was prepared by bonding a 10 µm lithium metal to a 20 µm thick copper foil.

Then, after an electrode assembly was prepared by disposing a porous polyethylene film between the above-prepared positive electrode and negative electrode, the electrode assembly was put in a battery case, the non-aqueous electrolyte solution prepared in Comparative Example 2 was injected, and the battery case was sealed to prepare a lithium secondary battery (see Table 1 below).

Comparative Example 4

(Non-Aqueous Electrolyte Solution Preparation)

After dimethyl carbonate (DMC) and 1,1,2,2-tetrafluoroethyl 2,2,2-trifluoroethyl ether were mixed in a volume ratio of 4:6, a non-aqueous electrolyte solution for a lithium secondary battery was prepared by dissolving LiFSI. In this case, since solubility of the lithium salt was decreased as the amount of the 1,1,2,2-tetrafluoroethyl 2,2,2-trifluoroethyl ether, as the second non-aqueous solvent, was increased, the LiFSI was dissolved at a maximum concentration of 1 M.

(Secondary Battery Preparation)

A lithium secondary battery was prepared in the same manner as in Comparative Example 1 except that the above-prepared non-aqueous electrolyte solution, instead of the non-aqueous electrolyte solution prepared in Comparative Example 1, was used (see Table 1 below).

Comparative Example 5

(Non-Aqueous Electrolyte Solution Preparation)

After dimethyl carbonate (DMC) and 1,1,2,2-tetrafluoroethyl 2,2,2-trifluoroethyl ether were mixed in a volume ratio of 9.5:0.5, a non-aqueous electrolyte solution for a lithium secondary battery was prepared by dissolving LiFSI at a concentration of 2.8 M.

(Secondary Battery Preparation)

A lithium secondary battery was prepared in the same manner as in Comparative Example 1 except that the above-prepared non-aqueous electrolyte solution, instead of the non-aqueous electrolyte solution prepared in Comparative Example 1, was used (see Table 1 below).

Abbreviations of compounds in the following Table 1 respectively mean the followings.

LiFSI: lithium bis(fluorosulfonyl)imide (LiN(SO$_2$F)$_2$)

DMC: dimethyl carbonate

FE: monofluorobenzene (FE)

NCM811: Li(Ni$_{0.8}$Mn$_{0.1}$Co$_{0.1}$)O$_2$

TABLE 1

| | Lithium salt | First non-aqueous solvent | Second non-aqueous solvent | Volume ratio of first non-aqueous solvent:second non-aqueous solvent | Positive electrode |
|---|---|---|---|---|---|
| Example 1 | 2.4M LiFSI | DMC | FB | 9:1 | NCM811 |
| Example 2 | 2.0M LiFSI | DMC | FB | 8:2 | NCM811 |
| Example 3 | 1.5M LiFSI | DMC | FB | 7:3 | NCM811 |
| Example 4 | 2.4M LiFSI | DMC | 1,1,2,2-tetrafluoroethyl 2,2,3,3-tetrafluoropropyl ether | 9:1 | NCM811 |
| Example 5 | 2.0M LiFSI | DMC | 1,1,2,2-tetrafluoroethyl 2,2,3,3-tetrafluoropropyl ether | 8:2 | NCM811 |
| Example 6 | 1.5M LiFSI | DMC | 1,1,2,2-tetrafluoroethyl 2,2,3,3-tetrafluoropropyl ether | 7:3 | NCM811 |
| Example 7 | 2.4M LiFSI | DMC | 1,1,2,2-tetrafluoroethyl 2,2,2-trifluoroethyl ether | 9:1 | NCM811 |
| Example 8 | 2.0M LiFSI | DMC | 1,1,2,2-tetrafluoroethyl 2,2,2-trifluoroethyl ether | 8:2 | NCM811 |
| Example 9 | 1.5M LiFSI | DMC | 1,1,2,2-tetrafluoroethyl 2,2,2-trifluoroethyl ether | 7:3 | NCM811 |
| Example 10 | 1.5M LiFSI | DMC | FB | 7:3 | NCM622 |
| Example 11 | 1.5M LiFSI | DMC | 1,1,2,2-tetrafluoroethyl 2,2,3,3-tetrafluoropropyl ether | 7:3 | NCM622 |
| Example 12 | 1.5M LiFSI | DMC | 1,1,2,2-tetrafluoroethyl 2,2,2-trifluoroethyl ether | 7:3 | NCM622 |
| Example 13 | 2.4M LiPFg | DMC | FB | 9:1 | NCM811 |
| Example 14 | 2.0M LiPFg | DMC | FB | 8:2 | NCM811 |
| Example 15 | 1.5M LiPFg | DMC | FB | 7:3 | NCM811 |
| Example 16 | 1.8M LiPFg | DMC | FB | 9:1 | NCM811 |
| Example 17 | 1.4M LiPFg | DMC | FB | 8:2 | NCM811 |
| Example 18 | 0.9M LiPFg | DMC | FB | 7:3 | NCM811 |
| Comparative Example 1 | 2.8M LiFSI | DMC | — | 10:0 | NCM811 |
| Comparative Example 2 | 2.4M LiFSI | DMC | — | 10:0 | NCM811 |
| Comparative Example 3 | 2.4M LiFSI | DMC | — | 10:0 | NCM622 |
| Comparative Example 4 | 1.0M LiFSI | DMC | 1,1,2,2-tetrafluoroethyl 2,2,2-trifluoroethyl ether | 4:6 | NCM811 |
| Comparative Example 5 | 2.8M LiFSI | DMC | 1,1,2,2-tetrafluoroethyl 2,2,2-trifluoroethyl ether | 9.5:0.5 | NCM811 |

EXPERIMENTAL EXAMPLES

Experimental Example 1. Viscosity Evaluation of Non-Aqueous Electrolyte Solution Viscosities of the non-aqueous electrolyte solutions prepared in Examples 1 to 18 and the non-aqueous electrolyte solutions prepared in Comparative Examples 1, 3, and 5 were measured using a LVDV-II+Pro viscometer (cone-plate type, torque 90%, spindle #42, sample loading amount 1 mL) by Brookfield at 25° C. The results thereof are presented in Table 2 below.

TABLE 2

| | Non-aqueous electrolyte solution viscosity (cp) |
|---|---|
| Example 1 | 8.60 |
| Example 2 | 4.86 |
| Example 3 | 1.03 |
| Example 4 | 8.83 |
| Example 5 | 5.26 |
| Example 6 | 4.19 |
| Example 7 | 8.03 |
| Example 8 | 4.42 |
| Example 9 | 3.34 |
| Example 10 | 1.03 |
| Example 11 | 4.19 |
| Example 12 | 3.34 |
| Example 13 | 8.90 |
| Example 14 | 5.07 |
| Example 15 | 2.26 |
| Example 16 | 8.70 |
| Example 17 | 4.99 |
| Example 18 | 2.01 |
| Comparative Example 1 | 12.8 |
| Comparative Example 3 | 12.8 |
| Comparative Example 5 | 12.2 |

Referring to Table 2, the viscosities of the non-aqueous electrolyte solutions of Comparative Examples 1, 3, and 5 were about 12.2 cp or more, but the viscosities of the non-aqueous electrolyte solutions prepared in Examples 1 to 18 of the present invention were about 8.90 cp or less, wherein it may be understood that the viscosities were improved. Particularly, when the viscosities of the non-aqueous electrolyte solutions prepared in Examples 1 to 18 of the present invention were examined, it may be understood that the viscosity was improved as the amount of the fluorine-based organic solvent was increased.

Experimental Example 2. Ionic Conductivity Evaluation of Non-Aqueous Electrolyte Solution Tonic conductivities of the non-aqueous electrolyte solutions prepared in Examples 1 to 5, 7 to 10, 12, 13, and 16 to 18 and ionic conductivities of the non-aqueous electrolyte solutions prepared in Comparative Examples 4 and 5 were measured using a Multiparameter system by Mettler Toledo at 25° C. The results thereof are presented in Table 3 below.

TABLE 3

| | Ionic conductivity ($10^{-1}$ mS/cm) |
|---|---|
| Example 1 | 7.52 |
| Example 2 | 7.48 |
| Example 3 | 7.23 |
| Example 4 | 7.56 |
| Example 5 | 7.80 |
| Example 7 | 7.67 |
| Example 8 | 8.12 |
| Example 9 | 7.23 |
| Example 10 | 7.23 |
| Example 12 | 7.23 |
| Example 13 | 4.98 |
| Example 16 | 7.11 |
| Example 17 | 7.07 |
| Example 18 | 6.98 |
| Comparative Example 4 | 3.22 |
| Comparative Example 5 | 7.21 |

Referring to Table 3, the ionic conductivities of the non-aqueous electrolyte solutions prepared in Examples 1 to 5, 7 to 10, 12, and 16 to 18 were about 6.98×10−1 mS/cm or more, but it may be understood that the ionic conductivity of the non-aqueous electrolyte solution prepared in Comparative Example 4 was reduced to 3.22×10−1 mS/cm. That is, with respect to the non-aqueous electrolyte solution prepared in Comparative Example 4, LiFSI was not dissolved well while the amount of the fluorine-based organic solvent, as the second non-aqueous solvent which did not form a coordination bond with the lithium salt, was increased, and, as a result, it may be understood that the ionic conductivity was significantly reduced in comparison to that of the non-aqueous electrolyte solution prepared in Example 9.

Also, with respect to the non-aqueous electrolyte solution prepared in Comparative Example 5, while the volume ratio of the second non-aqueous solvent was reduced, it may be understood that the ionic conductivity was reduced in comparison to those of the non-aqueous electrolyte solutions prepared in Examples 1 to 5, 7 to 10, and 12.

It may be understood that the ionic conductivities of the non-aqueous electrolyte solutions prepared in Examples 16 to 18 including $LiPF_6$, instead of LiFSI, as the lithium salt, were reduced in comparison to those of the non-aqueous electrolyte solutions prepared in Examples 1 to 5, 7 to 10, and 12 which included LiFSI as the lithium salt. Particularly, with respect to the non-aqueous electrolyte solution of Example 13 including a high concentration of $LiPF_6$, it may be understood that the ionic conductivity was significantly reduced in comparison to those of the non-aqueous electrolyte solutions prepared in Examples 1 to 5, 7 to 10, and 12 or that of the non-aqueous electrolyte solution of Comparative Example 5 including a high concentration of LiFSI due to an increase in the viscosity.

Experimental Example 3. Lithium Ion Diffusion Evaluation Test

Diffusivity of $Li^+$ ions in each of the non-aqueous electrolyte solutions prepared in Examples 1 to 3 and Comparative Examples 1 and 2 was evaluated, and the results thereof are presented in Table 4 below. The diffusivities of $Li^+$ ions were measured by 7Li DOSY NMR spectroscopy using a Bruker 600 MHz Avance III HD system.

TABLE 4

| | $Li^+$ diffusivity ($10^{-10}$ $m^2$/S) |
|---|---|
| Example 1 | 1.22 |
| Example 2 | 2.11 |
| Example 3 | 3.16 |
| Comparative Example 1 | 0.88 |
| Comparative Example 2 | 1.21 |

Referring to Table 4, the lithium ion diffusivities in the non-aqueous electrolyte solutions of Comparative Examples 1 and 2 were 1.21×10$^{-10}$ m$^2$/S or less, but it may be understood that the lithium ion diffusivities in the non-aqueous electrolyte solutions of Examples 1 to 3 of the present invention were improved to 1.22×10$^{-10}$ m$^2$/S or more.

Experimental Example 4. IR Band Area Ratio Evaluation Test

IR spectrum of each of the non-aqueous electrolyte solutions prepared in Examples 1 to 3 and Comparative Examples 1 and 2 was measured using an attenuated total reflection (ATR) mode of Fourier transform infrared (FT-IR) spectroscopy, and, after obtained peaks were integrated, values thus obtained were substituted into the following Equation 1 to calculate an IR band area ratio of $Li^+$ coordinated DMC solvent to Free DMC Solvent. The calculated IR band area ratios are presented in Table 5 below. (In this case, with respect to the fluorine-based organic solvent, as the second non-aqueous solvent which did not form a coordination bond with the lithium salt, it was not possible to identify an IR band.)

IR band area ratio=Area of $Li^+$ coordinated DMC/Area of Free DMC [Equation 1]

TABLE 5

| | IR band area ratio |
|---|---|
| Example 1 | 2.31 |
| Example 2 | 2.30 |
| Example 3 | 2.32 |
| Comparative Example 1 | 2.30 |
| Comparative Example 2 | 2.09 |

Referring to Table 5, the IR band area ratio of the non-aqueous electrolyte solution of Comparative Example 1, which did not include the fluorine-based organic solvent as the second non-aqueous solvent, while including 2.8 M lithium salt, was 2.3, but it may be understood that the IR band area ratio of the non-aqueous electrolyte solution of Comparative Example 2, in which a concentration of the lithium salt was decreased to 2.4 M, was reduced to 2.09 due to the decrease in the concentration of the lithium salt.

That is, it may be understood that, when the concentration of the lithium salt was decreased, a ratio of the carbonate solvent, as the first non-aqueous solvent participating in the dissociation of the lithium salt, was reduced and a ratio of the Free DMC solvent was increased.

IR band area ratios of the non-aqueous electrolyte solutions of Examples 1 to 3, in which the concentrations of the lithium salt were 2.4 M, 2.0 M, and 1.5 M, respectively, were in a range of 2.30 to 2.32, wherein it may be understood that these values were a similar level to the IR band area ratio (2.30) of the non-aqueous electrolyte solution of Comparative Example 1. That is, if the amount of the fluorine-based organic solvent, as the second non-aqueous solvent, which did not form a coordination bond with the lithium salt, but the concentration of the lithium salt was low as in the non-aqueous electrolyte solutions of Examples 1 to 3 of the present invention, was increased, it may be understood that the ratio of the carbonate solvent, as the first non-aqueous solvent participating in the dissociation of the lithium salt, was increased even under low lithium salt concentration conditions.

Thus, in the present invention, it seems that a lithium secondary battery having improved electrolyte solution wetting may be prepared by using a low viscosity non-aqueous electrolyte solution which included the fluorine-based organic solvent as the second non-aqueous solvent and had a low concentration of the lithium salt.

Experimental Example 5. Cycle Characteristics Evaluation

After an electrolyte solution impregnation process was performed on each of the secondary batteries prepared in Examples 1 to 12 and Examples 16 to 18 and the secondary batteries prepared in Comparative Examples 1 to 5 at 25° C. for 1 day, an initial formation process was performed in which each secondary battery was charged at 0.1 C to 4.2 V under a constant current-constant voltage condition at 25° C. and then discharged at a constant current of 0.1 C to 3.0 V.

Subsequently, each secondary battery was charged at 0.2 C to 4.2 V under a constant current-constant voltage condition and then discharged at a constant current of 2 C to 3.0 V. A cycle, in which the above charging and discharging were set as one cycle, was repeated 150 times.

In this case, the number of cycles, when 80% of capacity measured after the initial formation process was maintained, was checked, and the results thereof are presented in Table 6 below.

Experimental Example 6. Capacity Characteristics Evaluation

After an electrolyte solution impregnation process was performed on each of the secondary batteries prepared in Examples 1 to 12 and Examples 16 to 18 and the secondary batteries prepared in Comparative Examples 1 to 5 at 25° C. for 1 day, an initial formation process was performed in which each secondary battery was charged at 0.1 C to 4.2 V under a constant current-constant voltage condition at 25° C. and then discharged at a constant current of 0.1 C to 3.0 V.

Subsequently, after each secondary battery was charged at 0.2 C to 4.2 V under a constant current-constant voltage condition and discharged at a constant current of 3 C to 3.0 V, discharge capacities measured using PNE-0506 charge/discharge equipment (manufacturer: PNE SOLUTION Co., Ltd., 5 V, 6 A)) are presented in Table 6 below.

TABLE 6

| | 80% discharge capacity retention (the number of cycles) | Discharge capacity at 3 C (%) |
|---|---|---|
| Example 1 | 85 | 86 |
| Example 2 | 90 | 89 |
| Example 3 | 105 | 93 |
| Example 4 | 82 | 85 |
| Example 5 | 91 | 87 |
| Example 6 | 94 | 89 |
| Example 7 | 86 | 86 |
| Example 8 | 92 | 88 |
| Example 9 | 98 | 90 |

TABLE 6-continued

| | 80% discharge capacity retention (the number of cycles) | Discharge capacity at 3 C (%) |
|---|---|---|
| Example 10 | 103 | 90 |
| Example 11 | 101 | 91 |
| Example 12 | 105 | 91 |
| Example 16 | 78 | 80 |
| Example 17 | 84 | 81 |
| Example 18 | 91 | 81 |
| Comparative Example 1 | 68 | 77 |
| Comparative Example 2 | 43 | 79 |
| Comparative Example 3 | 72 | 77 |
| Comparative Example 4 | Difficult to evaluate cell | Difficult to evaluate cell |
| Comparative Example 5 | 70 | 78 |

Referring to Table 6, it may be understood that the lithium secondary batteries prepared in Examples 1 to 12 and Examples 16 to 18 of the present invention each maintained discharge capacity corresponding to 80% of initial discharge capacity after about 78 cycles.

In contrast, in terms of the fact that, with respect to the lithium secondary batteries of Comparative Examples 1 to 3 and 5, 80% discharge capacity retentions relative to initial discharge capacity were mostly measured before 72 cycles, it may be understood that the discharge capacity retentions were reduced in comparison to those of the examples.

Also, referring to Table 6, discharge capacities at 3 C of the non-aqueous electrolyte solutions of Comparative Examples 1 to 3 and 5 were about 79% or less, but it may be understood that discharge capacities of the non-aqueous electrolyte solutions prepared in Examples 1 to 12 and Examples 16 to 18 of the present invention were mostly improved to 80% or more.

Since the lithium secondary battery of Comparative Example 4 had low ionic conductivity, the battery was not smoothly operated, and thus, it was difficult to evaluate cycle characteristics and capacity characteristics of the secondary battery.

The invention claimed is:

1. A lithium secondary battery, comprising:
a positive electrode including a lithium transition metal oxide represented by Formula 1;
a negative electrode;
a separator disposed between the positive electrode and the negative electrode; and
a non-aqueous electrolyte solution containing a lithium salt, and a solvent,
wherein the lithium salt consists of $LiN(SO_2F)_2$ (LiFSI), $LiN(SO_2CF_3)_2$ (LITFSI), $LiN(SO_2C_2F_5)_2$ (LiBETI), or a combination thereof, and the lithium salt is in a concentration of 1.5 M to 2.8 M,
wherein the solvent consists of a first non-aqueous solvent and a second non-aqueous solvent, the first non-aqueous solvent is a carbonate-based organic solvent,
the second non-aqueous solvent is a fluorine-based organic solvent, and
a volume ratio of the first non-aqueous solvent to the second non-aqueous solvent is in a range of 7:3 to 9:1,
wherein the non-aqueous electrolyte solution does not comprise propylene carbonate, and
wherein the fluorine-based organic solvent is a fluorine-containing ether organic solvent represented by Formula 2, $Li(Ni_aCo_bMn_c)O_2$     [Formula 1]

wherein, in Formula 1,
0.6≤a≤0.9, 0.05≤b<0.3, 0.05≤c<0.3, and a+b+c=1, $$[R_1-O-R_2]_n \quad \text{[Formula 2]}$$

wherein, in Formula 2,
$R_1$ and $R_2$ are each independently an alkyl group having 1 to 10 carbon atoms substituted with at least one fluorine, and n is an integer of 1 to 10.

2. The lithium secondary battery of claim 1, wherein the lithium transition metal oxide is $Li(Ni_{0.6}Mn_{0.2}Co_{0.2})O_2$, $Li(Ni_{0.7}Mn_{0.15}Co_{0.15})O_2$, or $Li(Ni_{0.8}Mn_{0.1}Co_{0.1})O_2$.

3. The lithium secondary battery of claim 1, wherein the lithium transition metal oxide is $Li(Ni_{0.7}Mn_{0.15}Co_{0.15})O_2$ or $Li(Ni_{0.8}Mn_{0.1}Co_{0.1})O_2$.

4. The lithium secondary battery of claim 1, wherein the lithium salt is LiFSI.

5. The lithium secondary battery of claim 1, wherein, in Formula 2, $R_1$ is an alkyl group having 2 to 8 carbon atoms which is substituted with at least one fluorine, and $R_2$ is an alkyl group having 1 to 7 carbon atoms which is substituted with at least one fluorine.

6. The lithium secondary battery of claim 5, wherein $R_1$ is an alkyl group having 2 to 6 carbon atoms which is substituted with at least one fluorine, and $R_2$ is an alkyl group having 1 to 5 carbon atoms which is substituted with at least one fluorine.

7. The lithium secondary battery of claim 1, wherein the fluorine-containing ether organic solvent is 1,1,2,2-tetrafluoroethyl 2,2,3,3-tetrafluoropropyl ether or 1,1,2,2-tetrafluoroethyl 2,2,2-trifluoroethyl ether.

8. The lithium secondary battery of claim 1, wherein the non-aqueous electrolyte solution further comprises at least one additive of a cyclic carbonate-based compound, a halogen-substituted carbonate-based compound, a sultone-based compound, a sulfate-based compound, a phosphate-based compound, a borate-based compound, a nitrile-based compound, an amine-based compound, a silane-based compound, or a lithium salt-based compound.

* * * * *